United States Patent [19]

Schildt et al.

[11] Patent Number: 5,108,478
[45] Date of Patent: Apr. 28, 1992

[54] METHODS OF AND APPARATUS FOR THE FURTHER PROCESSING OF GOBS OF GLASS

[75] Inventors: Hinnerk Schildt; Klaus Pollath, both of Mainz; Ekkehard Wedekind, Frankfurt am Main, all of Fed. Rep. of Germany

[73] Assignee: Schott Glaswerke, Mainz, Fed. Rep. of Germany

[21] Appl. No.: 759,777

[22] Filed: Sep. 13, 1991

Related U.S. Application Data

[63] Continuation of Ser. No. 420,677, Oct. 10, 1989, abandoned, which is a continuation-in-part of Ser. No. 827, Jan. 6, 1987, abandoned, which is a continuation-in-part of Ser. No. 694,296, Jan. 24, 1985, abandoned.

[30] Foreign Application Priority Data

Jan. 31, 1984 [DE] Fed. Rep. of Germany ....... 3403229

[51] Int. Cl.⁵ .................. C03B 11/06; C03B 9/03; C03B 9/00
[52] U.S. Cl. .................................. 65/47; 65/46; 65/54; 65/64; 65/72; 65/76; 65/77; 65/79; 65/82
[58] Field of Search .................. 65/46, 47, 48, 49, 54, 65/64, 66, 68, 72, 73, 74, 76, 77, 79, 82, 142, 228, 229

[56] References Cited

U.S. PATENT DOCUMENTS

| 693,130 | 2/1902 | Haley et al. | 65/229 |
| 1,777,206 | 9/1930 | Burthe et al. | 65/79 |
| 2,338,269 | 1/1944 | Schwarz | 65/79 |
| 4,411,681 | 10/1983 | Northup | 65/68 |
| 4,619,682 | 10/1986 | Gunthner | 65/76 |

FOREIGN PATENT DOCUMENTS

| 293169 | 10/1915 | Fed. Rep. of Germany . |
| 2161885 | 7/1973 | Fed. Rep. of Germany . |
| 2250715 | 7/1975 | France | 65/68 |
| 1441771 | 7/1976 | United Kingdom | 65/68 |

Primary Examiner—Kenneth M. Schor
Attorney, Agent, or Firm—Nies, Kurz, Bergert & Tamburro

[57] ABSTRACT

A gob of glass sucked from a glass metal and held in a suction mold (7) is further processed by preshaping the glass in the mold by a punch (4) having a projection (9) for forming in a recess or cavity (14) in the gob in the opening in the mold, and a plate-like surface (10) for forming a plate shaped bead (5) around the opening. This results in a large contact surface against which a blowpipe (1') with a transverse attachment plate (6) having a working surface flush with the end of the bore (3) of the blowpipe is pressed to attach the plate (6) to the bead (5). With this arrangement, the bore cannot become blocked with glass during the pressing operation.

2 Claims, 2 Drawing Sheets

METHODS OF AND APPARATUS FOR THE FURTHER PROCESSING OF GOBS OF GLASS

CROSS REFERENCE TO RELATED APPLICATIONS

This application is a continuation of application Ser. No. 07/420,677, filed Oct. 10, 1989, now abandoned, which is a continuation of application Ser. No. 07/000,827, filed Jan. 6, 1987, now abandoned, which is a continuation of application Ser. No. 06/694,296, filed Jan. 24, 1985, now abandoned.

This invention relates to methods of and apparatus for the further processing of gobs of glass.

In particular, the present invention is concerned with the further processing of a gob of glass which has been sucked from a glass melt and held in a suction mould for subsequent transfer to a blowpipe, and with the attachment of the glass gob to a blowpipe.

BACKGROUND OF THE INVENTION

It is known from German Patent Specification No 21 61 885 to use a tool such as a punch to form a recess in part of the glass which has been forced out of the mould, the diameter of the recess being equal to that of the blowpipe, by the action of the tool on the glass. The form of the tool is such that the glass driven out from the mould by the punch is pressed into an annular recess in the punch tool.

After being thus pressed, the glass gob is delivered to this blowpipe by inserting the blowpipe into the recess. This process, however, has the disadvantage in that when the blowpipe is inserted for attachment to the glass gob, the pressure that can be produced at the blowpipe/glass contact surface is small, since the glass can escape outwards away from the blowpipe/glass interface thereby preventing the build-up of pressure necessary for an effective attachment of the blowpipe to the glass gob.

Furthermore, with this known arrangement the blowpipes/glass interface contact surface is too small to enable heavy gobs to be held on the blowpipe. Thus the requisite adherence between the blowpipe and the glass is difficult to attain, so that the blowpipe has to be variably pressed into the glass, sometimes deeply and sometimes less deeply into the glass to achieve the requisite adherence.

In this known process the blowpipe bore often becomes clogged by the glass. Consequently, an orderly and economic operation becomes impossible or very difficult.

German Patent Specification No AS 293 169 discloses a method in which a semi-finished glass object having an open side is formed with one or more projecting adhesive edges at the open side, the edges being connected to an attachment or mounting plate provided at the end of a blowpipe, which plate is flush with the end of the blowpipe tube. However, the contact surface is so small that heavy glass gobs cannot be reliably held upon the blowpipe.

OBJECTS OF THE INVENTION

An object of the present invention is to facilitate the production of an adequate contact surface between the glass and the blow pipe whereby the mounting of relatively heavy glass gobs can be reliably achieved.

A further object of the invention is to provide tool for carrying out the method of the invention.

SUMMARY OF THE INVENTION

Broadly, according to a first aspect of the invention there is provided a method of facilitating the attachment of a blowpipe to a gob of glass sucked from a glass melt and held in a suction mould, comprising the steps of preshaping the gob of glass by driving glass out of the mould opening; forming around the mould opening a plate shaped bead having a recess or cavity therein; and pressing a blowpipe with a transverse gob attachment plate against the bead, whereby the blowpipe becomes attached to the bead by the application of pressure.

A second aspect of the invention provides a tool for forming the bead and the recess or cavity.

BRIEF DESCRIPTION OF THE FIGURES

For a better understanding of the invention and to show how the same may be carried into effect reference will now be made to the accompanying drawings in which.

DESCRIPTION OF THE INVENTION

Figure 1:
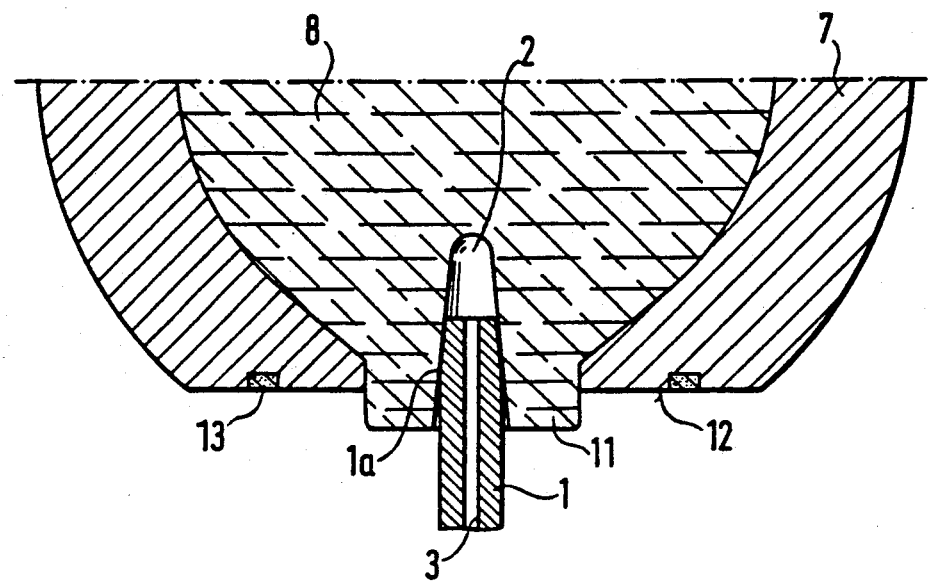
FIG. 1 is a section through a known construction of a suction mould, only a part of which is shown, and a blowpipe attachment end.

Referring not to FIG. 1 which illustrates a gob 8 of glass held in a suction mould 7, the gob being preshaped by the method described in German Patent Specification No 21 61 885 so as to produce a bead 11. In order to transfer the gob 8 from the mould a blowpipe 1 is inserted into a recess or cavity 2 formed in the glass 8 and the bead 11. The suction mould 7 presents a plane surface 12 having an inlaid pressure ring or washer 13. As will be seen the resulting interface or contact surface between the glass and the blowpipe 1 is usually restricted to the tapering part 1a of the blowpipe 1.

Figure 2:
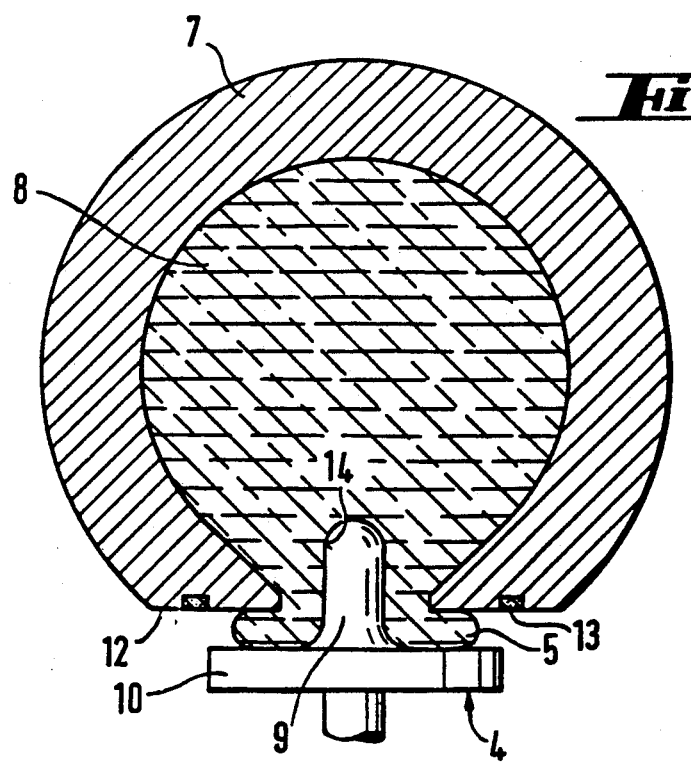
FIG. 2 is a section of a suction mould and illustrating a stage in the method of the invention.
Figure 3:
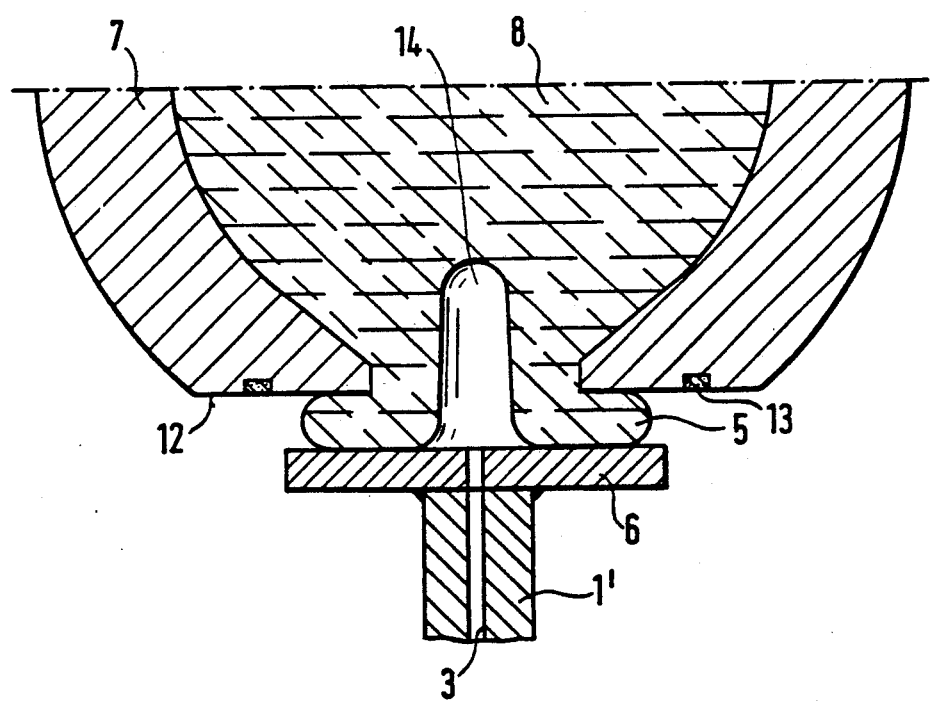
FIG. 3 is a section of part of the mould of FIG. 2, and illustrating the attachment of a blowpipe in accordance with a further stage of the method of the invention.

In FIG. 2 the glass gob 8 is pre-shaped by means of a tool i.e., punch 4, having a spike, pin or the like projection 9 upstanding from a transversely directed plate 10, by pressing the tool against the portion of the glass adjacent the opening of the mould so that the projection 9 forms a cavity 14 in the glass whereby a corresponding volume of glass is forced out from the mould, the glass driven out from the mould forming the bead 5. By pressing the tool 4 with sufficient pressure the bead will be pressed into a plate like form. It will thus be seen that the tool produces simultaneously the recess or cavity 14 and a plate like bead 5.

A blowpipe 1' having a transversely directed gob attachment plate 6 at the end thereof, the attachment surface of the plate 6 being flush with the end of the pipe, is firmly pressed, whilst the plate is pre-heated to a suitable working temperature, against the plate like bead 5. Since the bead 5 is effectively supported by the adjacent region of the surface 12 of the mould and thus sandwiched between the mould surface 12 and the plate 6 it is possible to press the plate 6 against the bead 5 with sufficient pressure to ensure that the plate 6 becomes firmly attached to the bead and thus the glass gob.

It will be noted that since the plate 6 working surface is flush with the end of the bore 3 in the blowpipe, which bore aligns with the recess or cavity 14, glass is not forced into the bore 3 so that clogging of the bore during the blowpipe attachment operation is avoided.

What is claimed is:

1. A method of facilitating the attachment of a blow pipe to a gob of glass removed from a glass melt and held in a suction mold, said mold having an opening surrounded by an essentially planar surface, comprising the steps of providing said glass gob held in said suction mold, providing a shaping tool having a central spike surrounded by a plate, where the spike protrudes from the plate transversely to the plate and the spike is connected to the plate, preshaping the gob of glass by driving the shaping tool spike first through the opening in said mold and then into said mold to cause the spike to force a portion of the glass out of the mold openings and to form a recess in said gob, the shaping tool spike being driven into the mold sufficiently to thereby form said portion of glass forced out of the mold opening into a plate shaped glass bead against said planar surface of said mold, said bead having a flat outer surface surrounding said recess, said flat outer surface being formed by said shaping tool plate and being over the entire length of the flat outer surface to said essentially planar surface of said mold, removing said shaping tool to expose said flat outer surface of said bead and thereafter providing a blow pipe having a central bore and a gob attachment plate transverse to said central bore, firmly pressing said blow pipe against said flat outer surface of said bead such that said gob attachment plate mates with the bead flat outer surface with said bore being aligned with said recess for fluid flow, said firmly pressing being effected while said gob attachment plate is heated to thereby ensure that said gob attachment plate becomes firmly attached to the flat outer surface of said bead and thereby attached to said glass gob.

2. The method of claim 1, wherein a space is maintained between the exit of said bore leading into the recess and the glass around said recess to thereby prevent clogging of said bore.

* * * * *